(12) United States Patent
Zhou et al.

(10) Patent No.: US 12,142,423 B2
(45) Date of Patent: Nov. 12, 2024

(54) SOLENOID VALVE ABNORMALITY DETECTION DEVICE, AUTOMATIC MEDICAL ANALYSIS APPARATUS USING SAME, AND SOLENOID VALVE ABNORMALITY DETECTION METHOD

(71) Applicant: HITACHI HIGH-TECH CORPORATION, Tokyo (JP)

(72) Inventors: Guangbin Zhou, Tokyo (JP); Hiroshi Suzuki, Tokyo (JP); Gorou Yoshida, Tokyo (JP); Kazuhiro Tanaka, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 236 days.

(21) Appl. No.: 17/997,382

(22) PCT Filed: Mar. 2, 2021

(86) PCT No.: PCT/JP2021/007844
§ 371 (c)(1),
(2) Date: Oct. 28, 2022

(87) PCT Pub. No.: WO2021/229895
PCT Pub. Date: Nov. 18, 2021

(65) Prior Publication Data
US 2023/0230741 A1    Jul. 20, 2023

(30) Foreign Application Priority Data

May 12, 2020    (JP) ................................ 2020-083774

(51) Int. Cl.
*H01F 7/18*    (2006.01)
*F16K 31/06*    (2006.01)
*F16K 37/00*    (2006.01)

(52) U.S. Cl.
CPC ........... *H01F 7/1844* (2013.01); *F16K 31/06* (2013.01); *F16K 37/0041* (2013.01)

(58) Field of Classification Search
CPC ..... F16K 37/0041; F16K 31/06; H01F 7/1844
See application file for complete search history.

(56) References Cited

U.S. PATENT DOCUMENTS 5,152,266 A * 10/1992 Sekiguchi ........... F02D 35/0007
                                                 361/152
5,243,296 A * 9/1993 Ando ................. G01R 31/2829
                                                324/207.22

(Continued)

FOREIGN PATENT DOCUMENTS

JP    H06-33730 B2    5/1994
JP    2001-197772 A    7/2001

(Continued)

OTHER PUBLICATIONS

International Search Report, mailed May 25, 2021, for International Application No. PCT/JP2021/007844.

*Primary Examiner* — Scott Bauer
(74) *Attorney, Agent, or Firm* — Baker Botts L.L.P.

(57) ABSTRACT

The present invention accurately estimates the opening state of a solenoid valve using a feature amount based on driving current information of the solenoid valve. A solenoid valve abnormality detection device, which uses a driving current pattern associated with valve opening of a solenoid valve and detected by a current sensor to detect an abnormality of the solenoid valve, comprises: a feature amount extraction unit that determines a feature amount of a driving current pattern associated with valve opening of the solenoid valve within a predetermined detection period; a feature amount correction unit that estimates the valve temperature of the solenoid valve; and an opening state estimation unit that estimates the opening state of the solenoid valve using the (Continued)

feature amount value corrected by the feature amount correction unit.

15 Claims, 15 Drawing Sheets

(56) References Cited

U.S. PATENT DOCUMENTS

| | | | | |
|---|---|---|---|---|
| 2006/0021345 | A1* | 2/2006 | Mc Donald | F02D 23/00 |
| | | | | 60/602 |
| 2010/0101395 | A1* | 4/2010 | Ohnishi | G01K 13/00 |
| | | | | 84/20 |
| 2020/0225254 | A1 | 7/2020 | Hara et al. | |

FOREIGN PATENT DOCUMENTS

| | | |
|---|---|---|
| JP | 2011-141019 A | 7/2011 |
| JP | 2014-092068 A | 5/2014 |
| JP | 2015-233054 A | 12/2015 |
| JP | 2016-121923 A | 7/2016 |
| WO | WO 2018/055931 A1 | 3/2018 |

\* cited by examiner

[FIG. 1]
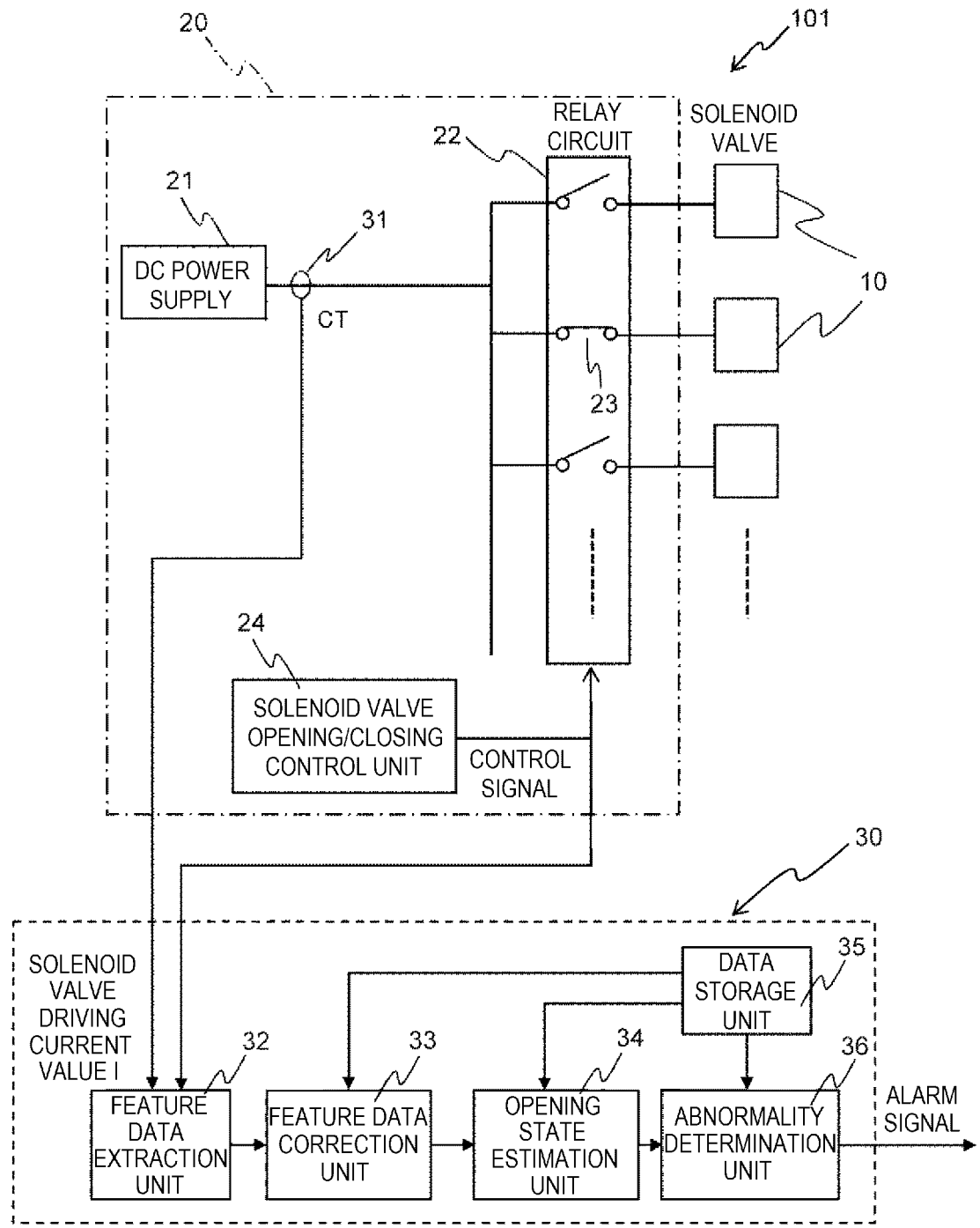

[FIG. 2]
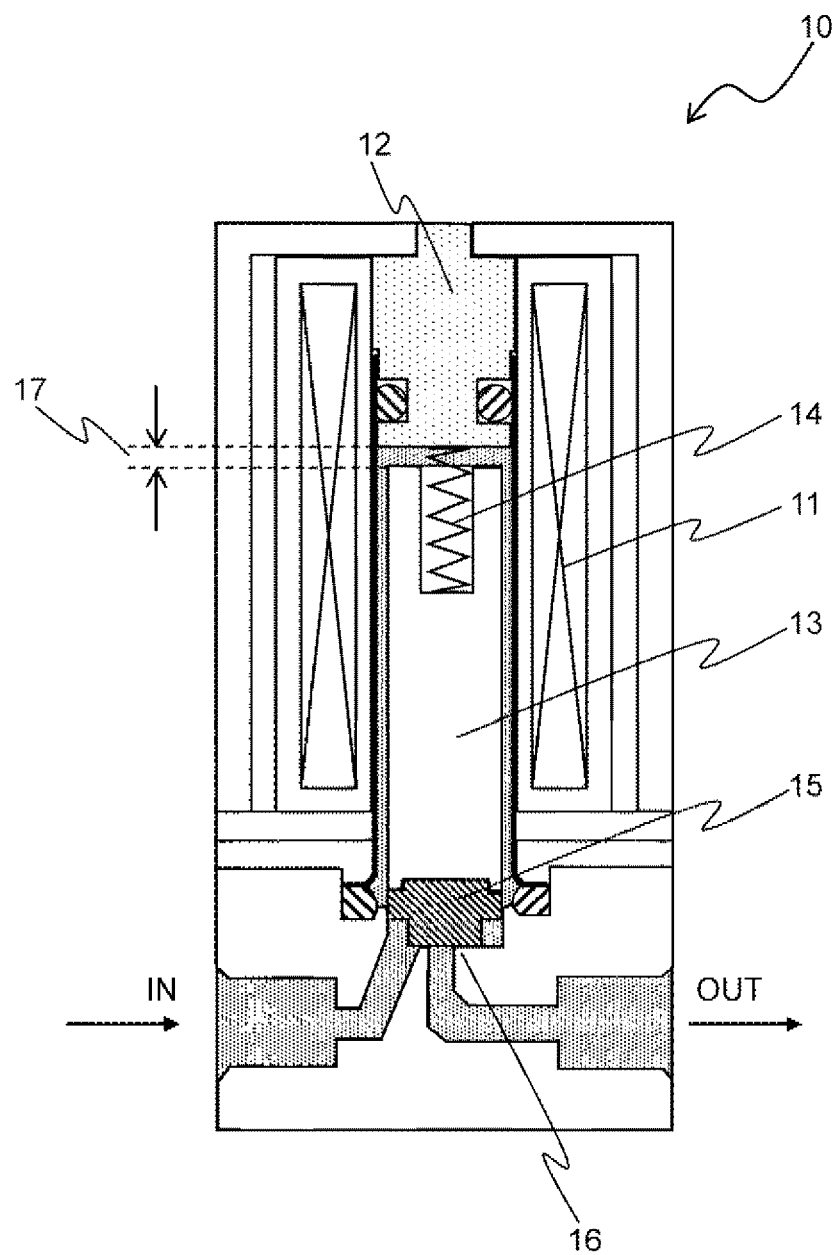

[FIG. 3]
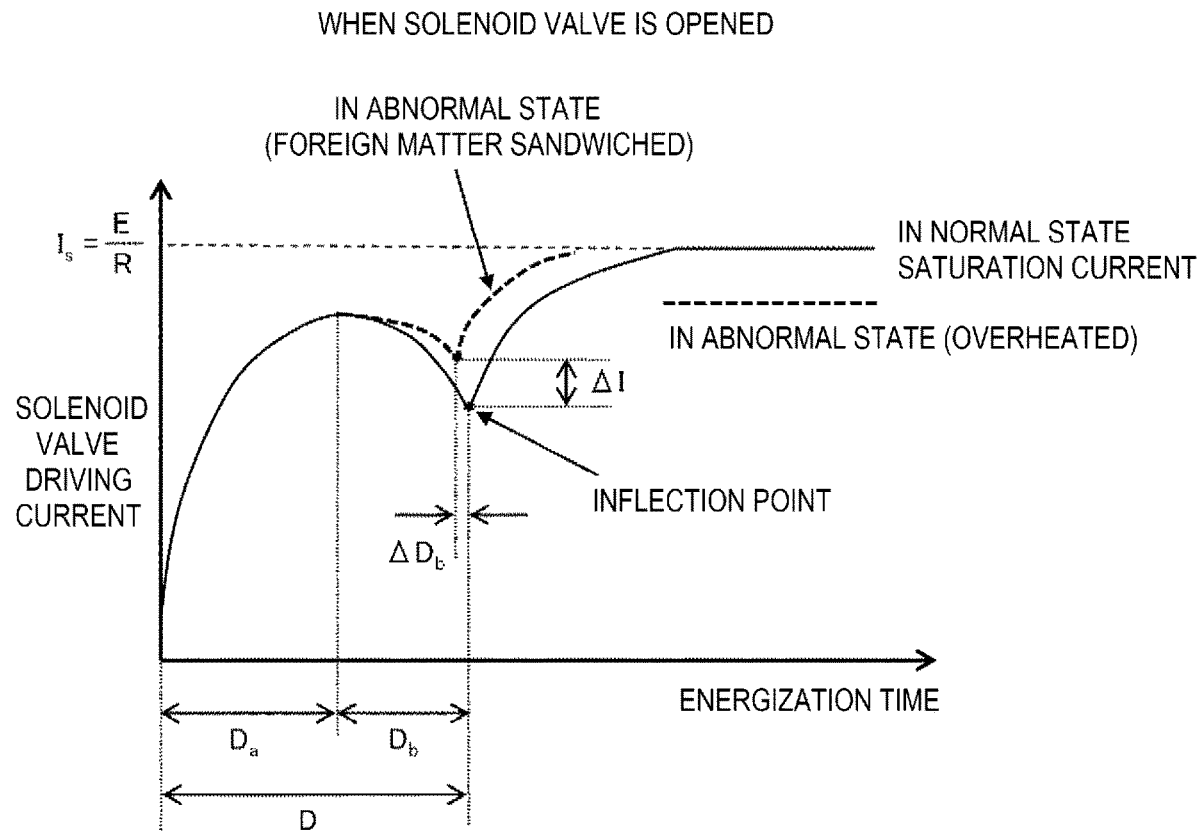
[FIG. 4]
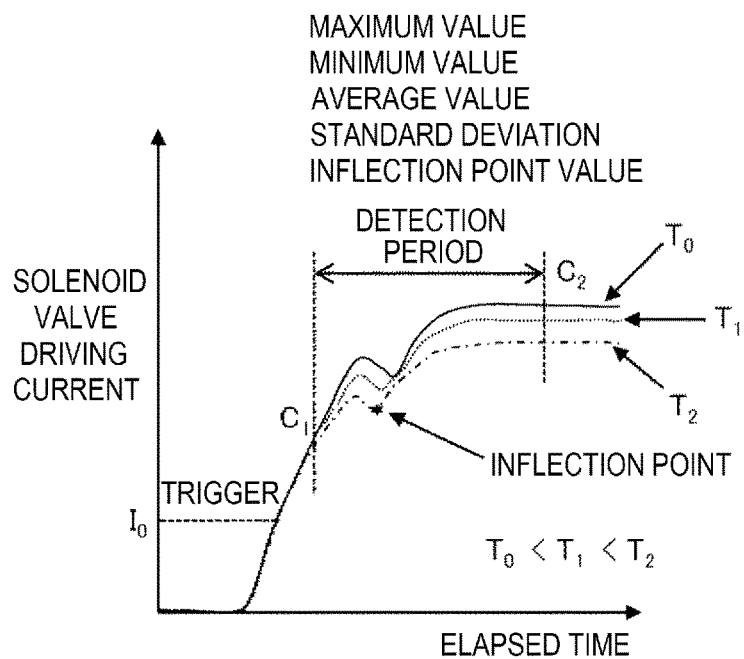

[FIG. 5]
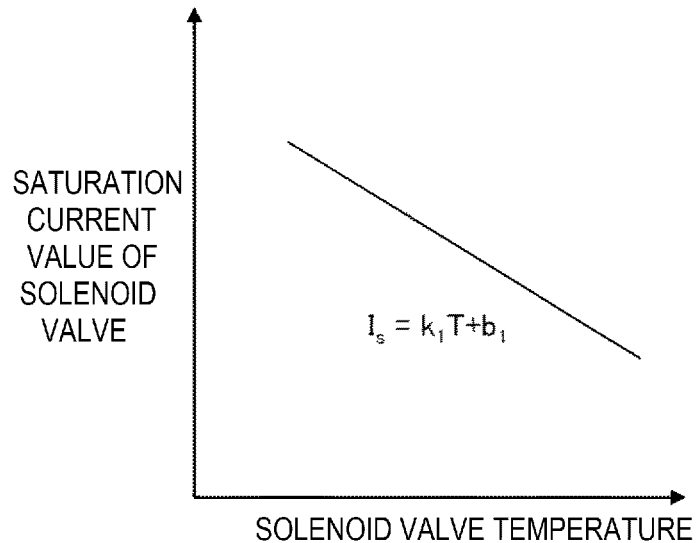
[FIG. 6]
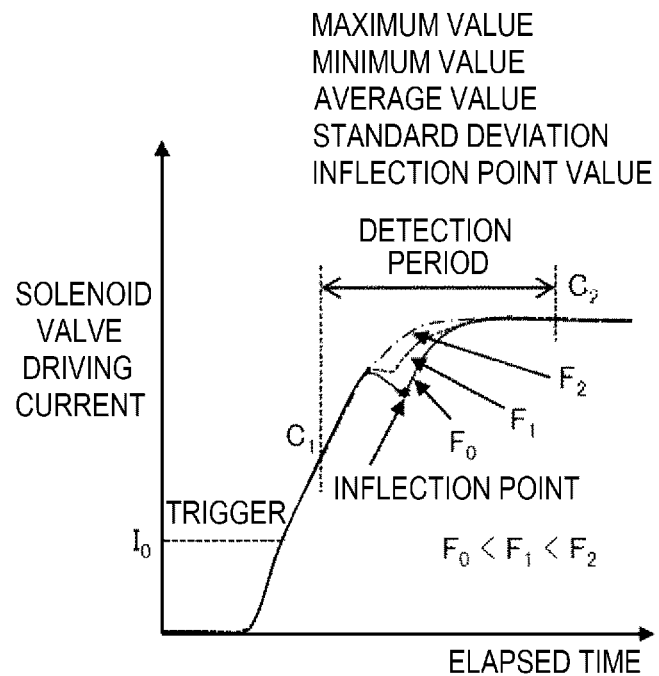

[FIG. 7]
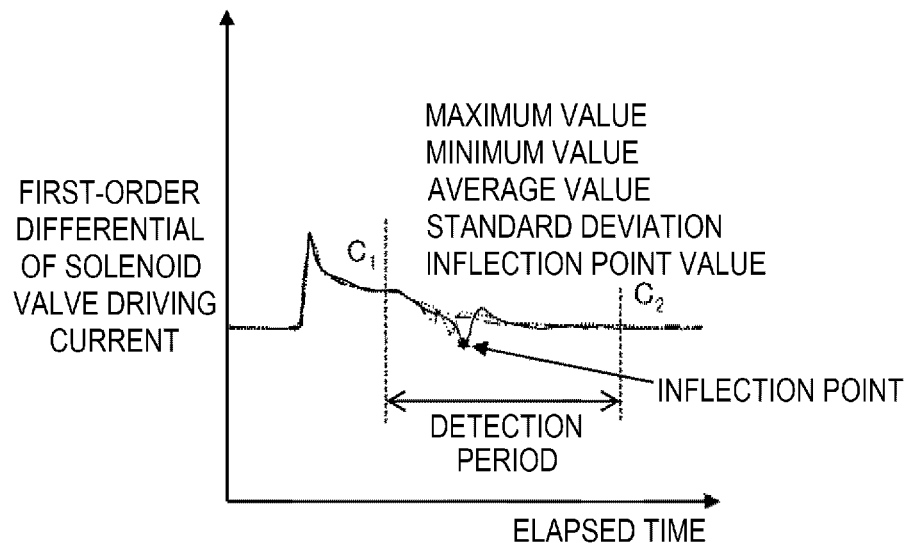
[FIG. 8]
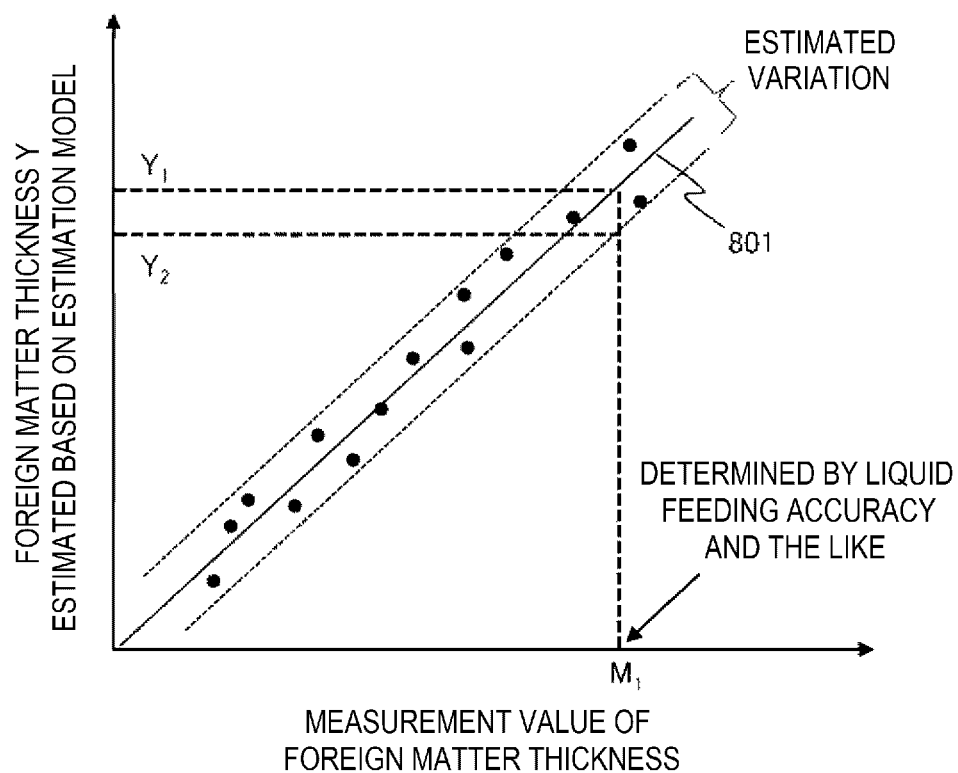

[FIG. 9A]
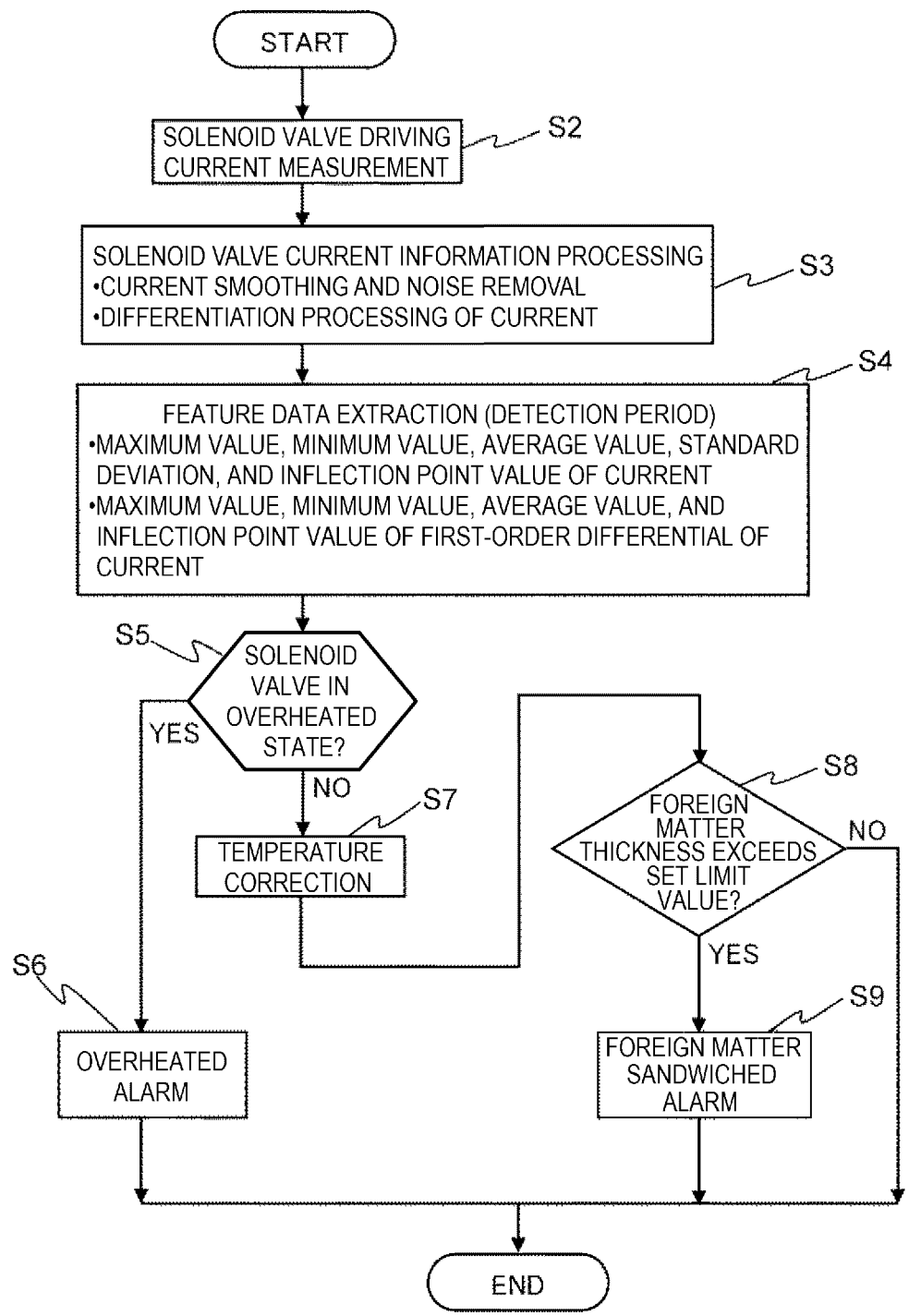

[FIG. 9B]
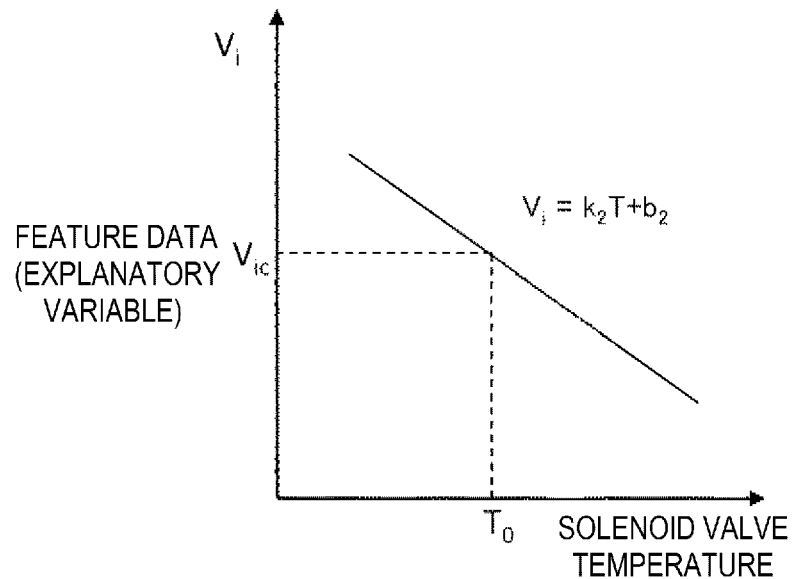
[FIG. 10]
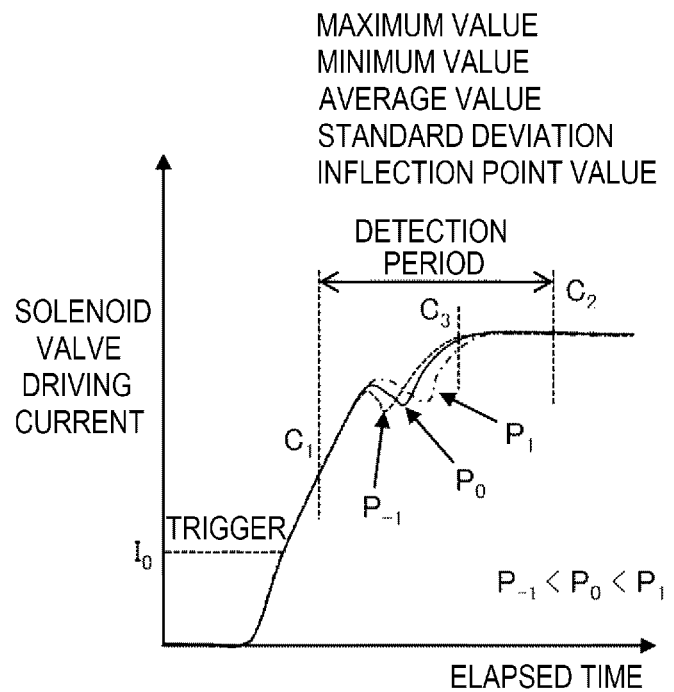

[FIG. 11]
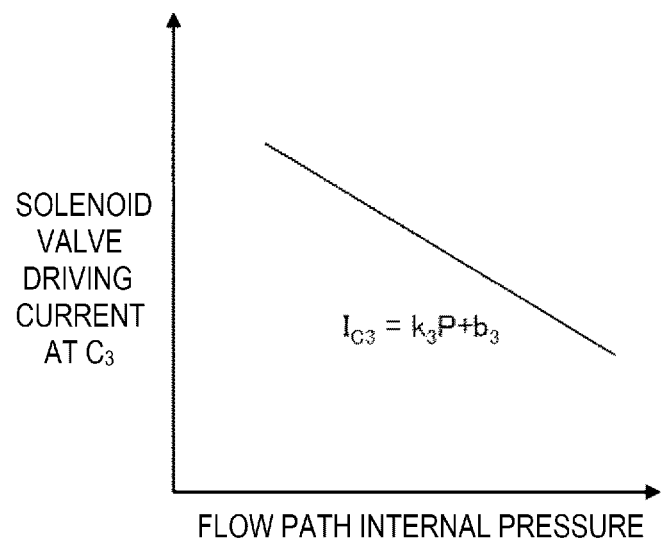

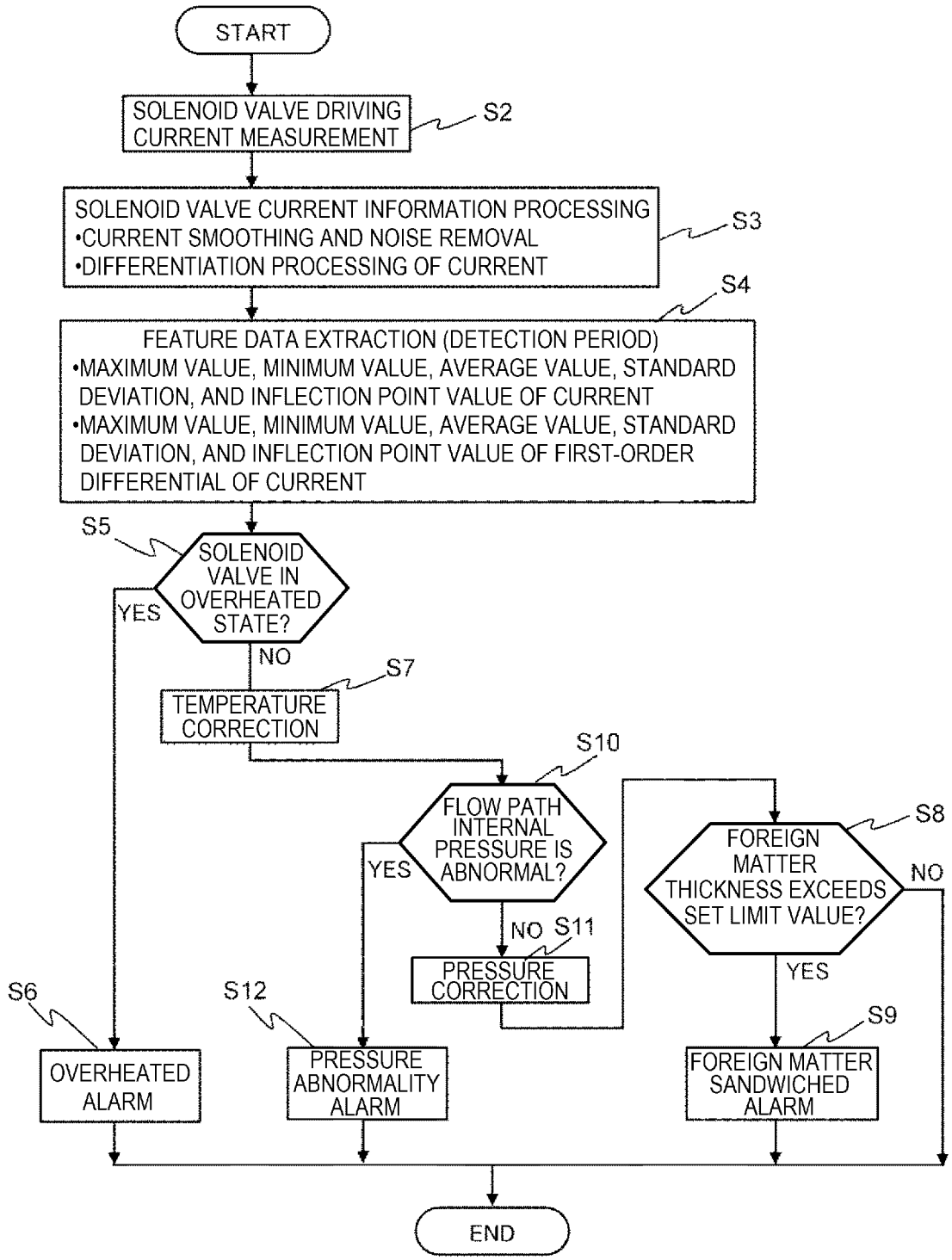
[FIG. 12A]

[FIG. 12B]
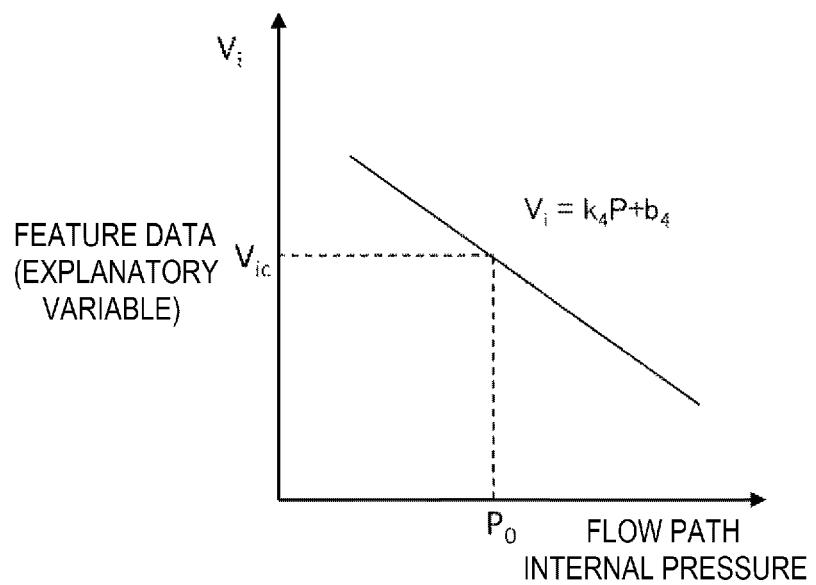

[FIG. 13]
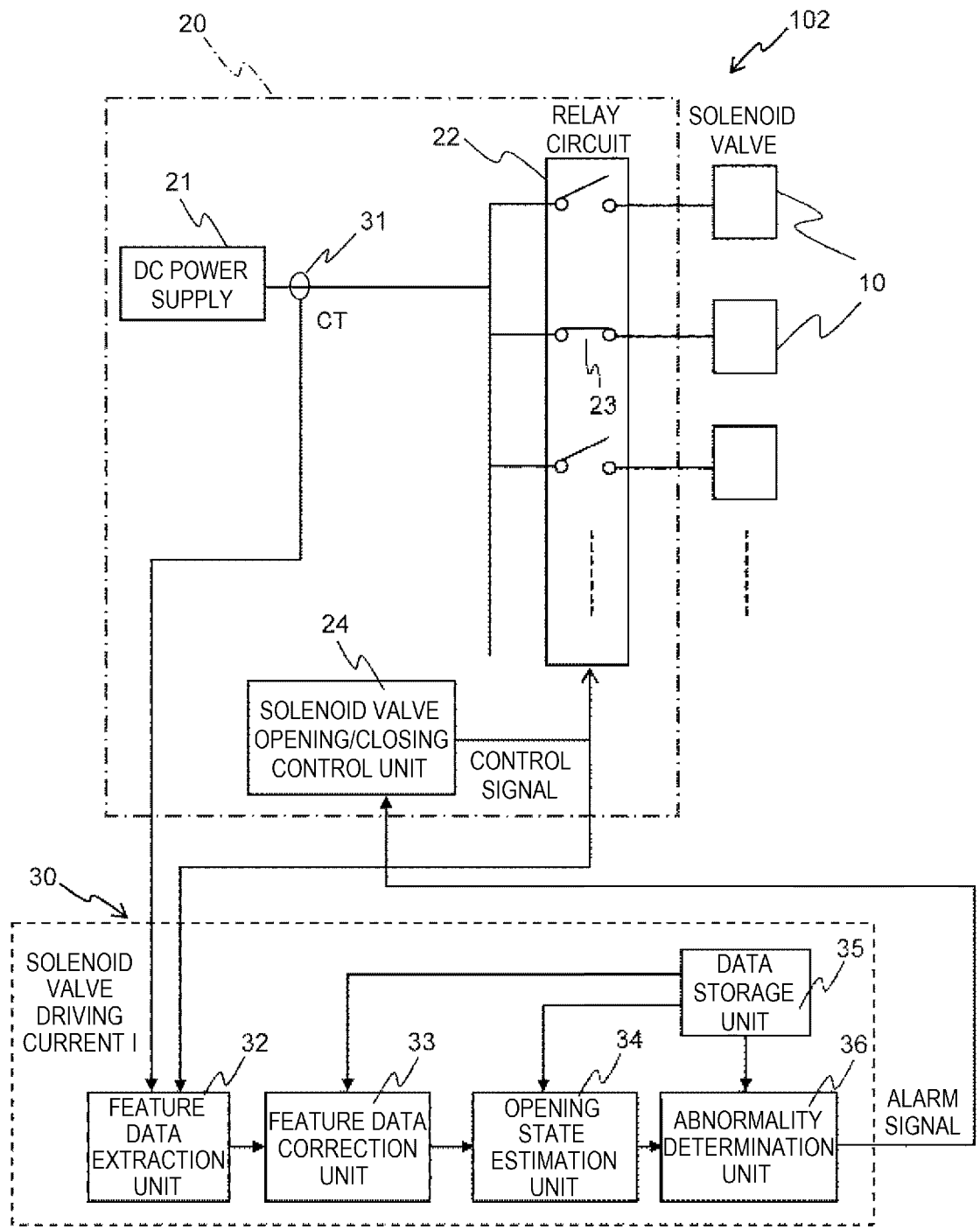

[FIG. 14]
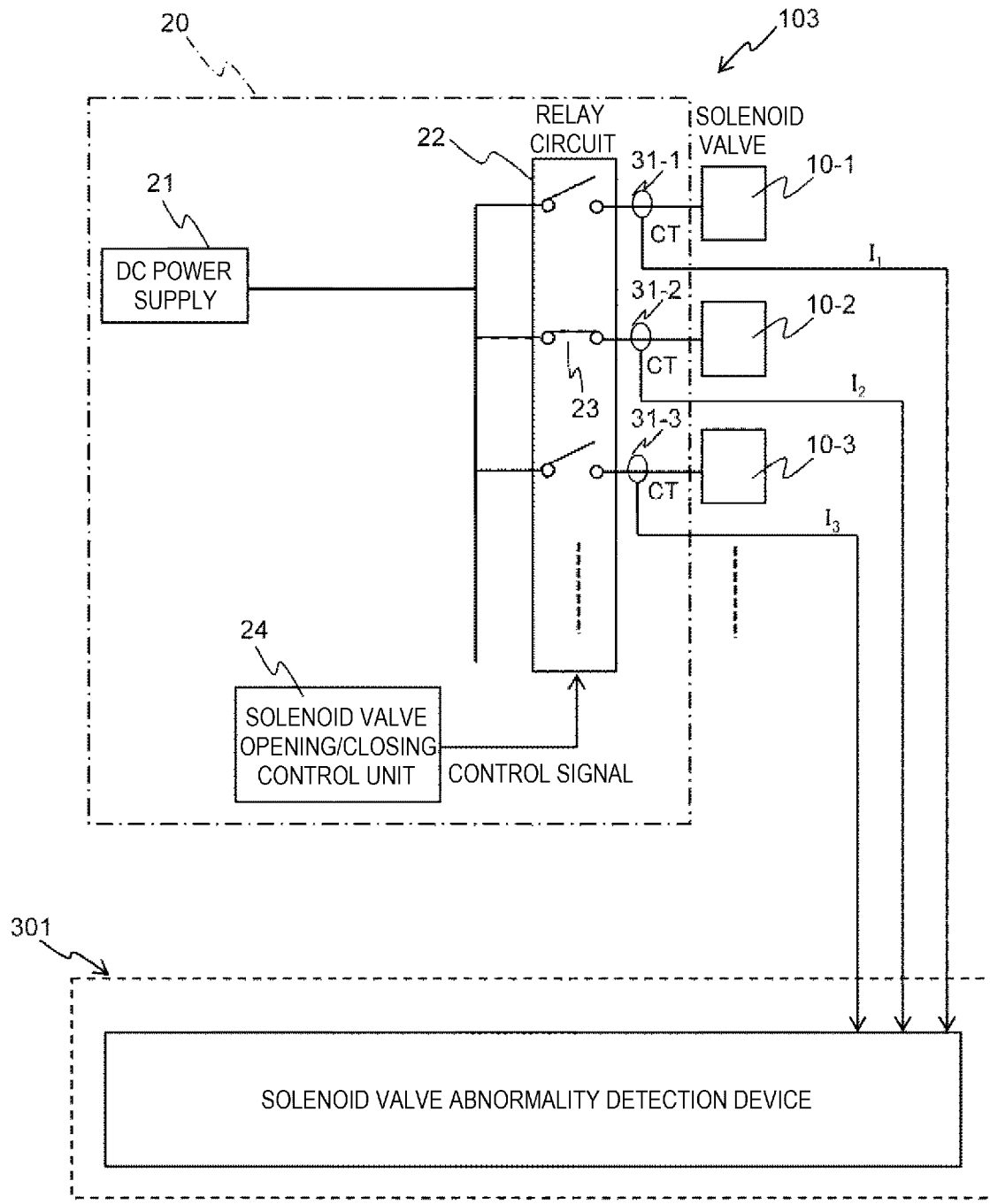

[FIG. 15]
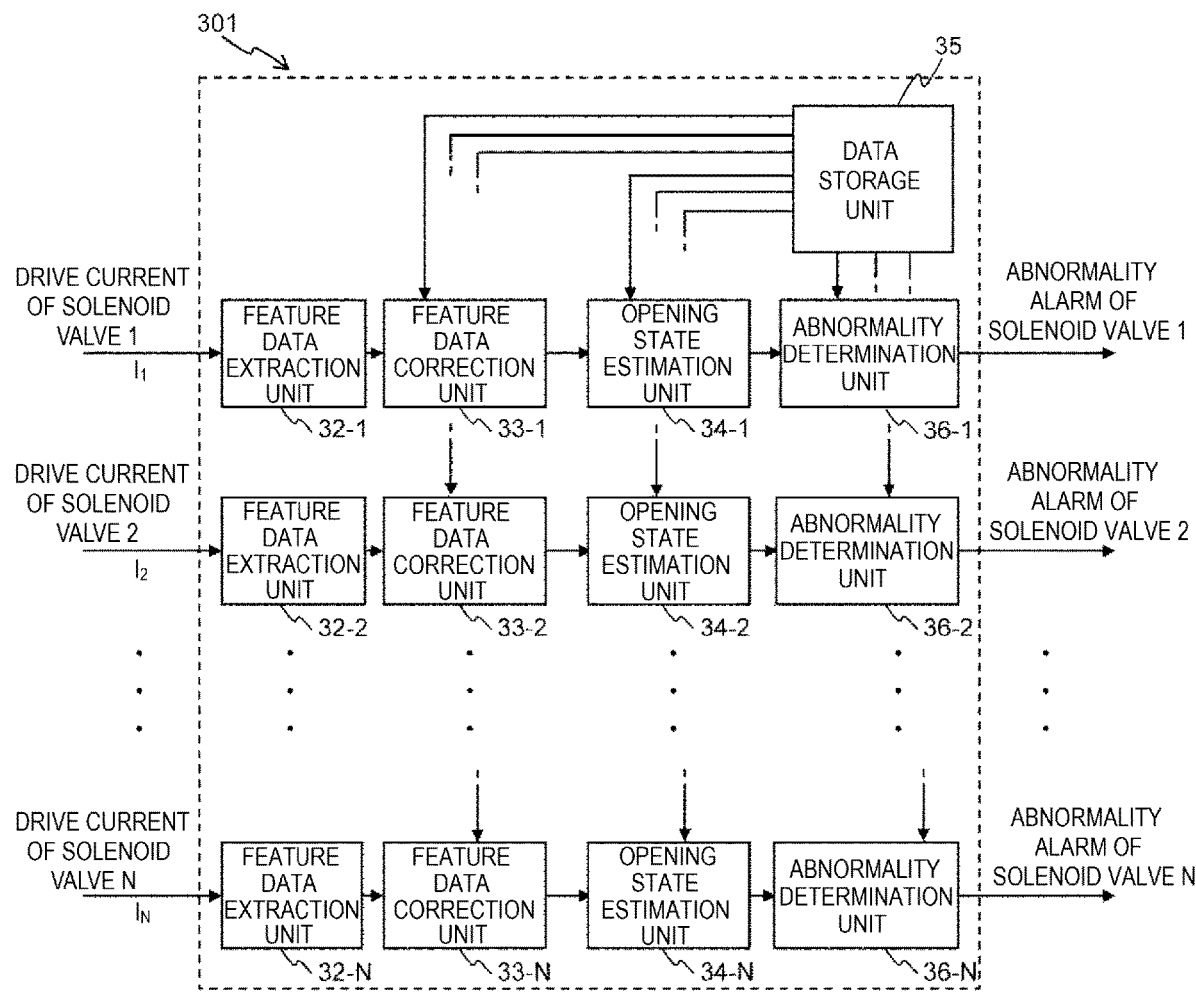

[FIG. 16]
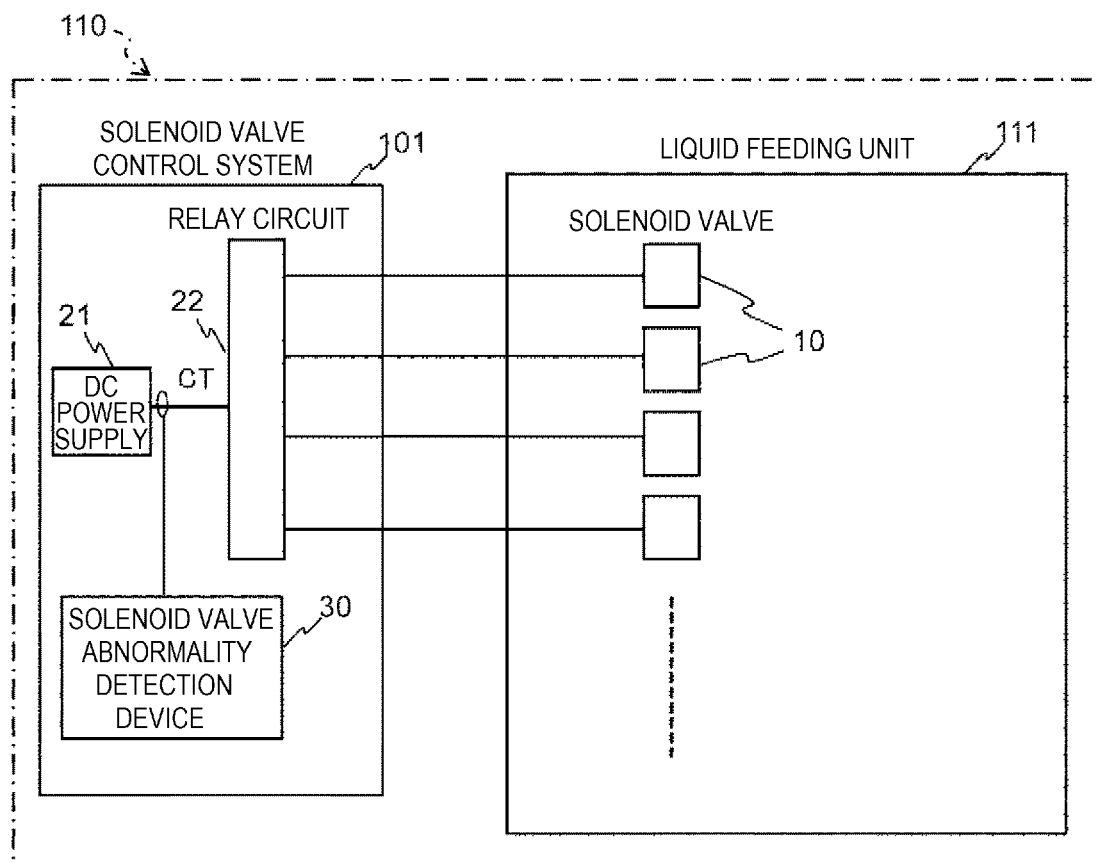

[FIG. 17]
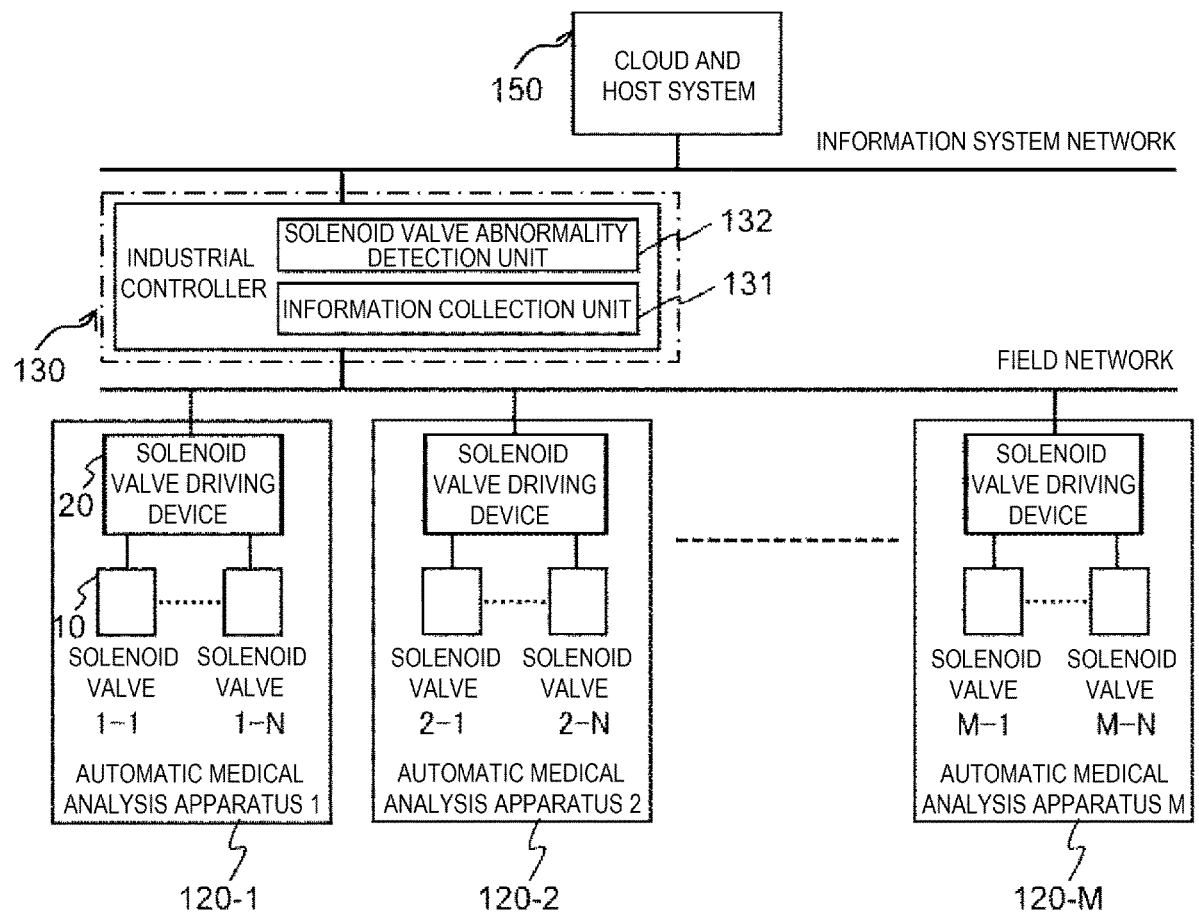

SOLENOID VALVE ABNORMALITY DETECTION DEVICE, AUTOMATIC MEDICAL ANALYSIS APPARATUS USING SAME, AND SOLENOID VALVE ABNORMALITY DETECTION METHOD

TECHNICAL FIELD

The present invention relates to a solenoid valve abnormality detection device for monitoring a state of a solenoid valve that opens and closes a flow path of an automatic medical analysis apparatus and the like, an automatic medical analysis apparatus using the same, and a solenoid valve abnormality detection method.

BACKGROUND ART

In recent years, with rapid progress in medical technologies, various types of automatic medical analysis apparatuses that automatically measure a concentration of a specific component in a body fluid are introduced into clinical laboratories in such as hospitals and examination centers, and among these apparatuses, an automatic medical analysis apparatus capable of grasping a visceral disease by components in blood or urine is an essential apparatus for a medical facility regardless of scale. An analysis unit of the automatic medical analysis apparatus sequentially performs sample dispensing, reagent dispensing, stirring, photometry, cleaning of a reaction cell, and data processing such as concentration conversion. In this series of operations, many solenoid valves that cause a fluid in a flow path to stop or flow by turning on or turning off a driving current are used, and high reliability of opening/closing operations and high accuracy control of the fluid passing through the flow path are required.

A solenoid valve is widely used in a device that is required to control a fluid. PTL 1 discloses a method for estimating an opening and closed state of a solenoid valve using a solenoid valve driving current without newly adding a sensor such as a position sensor or a vibration sensor. PTL 2 discloses a method for estimating a flow path internal pressure based on driving current information of a solenoid valve.

CITATION LIST

Patent Literature

PTL 1: JP-A-2011-141019
PTL 2: JP-A-2014-92068

SUMMARY OF INVENTION

Technical Problem

In a current automatic medical analysis apparatus, a sensor or unit that detects an opening/closing abnormality of a solenoid valve is not mounted, and when an abnormality occurs in the solenoid valve, a sample of a patient may be wasted until an apparatus failure is found based on an analysis result.

Since many solenoid valves are used in the automatic medical analysis apparatus, a sensor that detects the abnormality cannot be provided for each of the solenoid valves, and it is desirable to detect the abnormality based on driving current information of the solenoid valves as in the prior art documents. On the other hand, in methods in the related art, a solenoid valve having a large flow rate and a considerably large solenoid valve driving current is considered as a target, and the disclosed methods cannot be applied directly. For example, although a complete valve opening or valve closed state is estimated in the prior art documents, a driving current waveform of the solenoid valve used in the automatic medical analysis apparatus is small, and various factors affecting the driving current waveform are superimposed, so that it is difficult to understand characteristics of the driving current waveform. Therefore, it is difficult to estimate the state of the solenoid valve based on the solenoid valve driving current.

Solution to Problem

A solenoid valve abnormality detection device according to an embodiment of the invention is a solenoid valve abnormality detection device for detecting an abnormality of a solenoid valve based on a driving current pattern which is associated with solenoid valve opening of the solenoid valve and which is detected by a current sensor. The solenoid valve abnormality detection device includes: a feature data extraction unit configured to obtain feature data of the driving current pattern associated with the solenoid valve opening of the solenoid valve in a predetermined detection period; a feature data correction unit configured to estimate a solenoid valve temperature of the solenoid valve based on a saturation current value of the solenoid valve, and correct a value of the feature data obtained by the feature data extraction unit to a value at a reference temperature that is based on the estimated solenoid valve temperature; and an opening state estimation unit configured to estimate an opening state of the solenoid valve using an estimation model configured to estimate the opening state of the solenoid valve based on the feature data of the driving current pattern associated with the solenoid valve opening of the solenoid valve and the value of the feature data corrected by the feature data correction unit.

Advantageous Effects of Invention

It is possible to accurately estimate an opening state of a solenoid valve using feature data based on driving current information of the solenoid valve.

Problems, configurations, and effects other than those described above will be apparent from the following description of embodiments.

BRIEF DESCRIPTION OF DRAWINGS

FIG. 1 is a block diagram of a solenoid valve control system.
FIG. 2 is a diagram showing a schematic structure of a non-diaphragm type solenoid valve.
FIG. 3 is a diagram showing a change in a solenoid valve driving current when a solenoid valve is open.
FIG. 4 is a diagram showing a change in the solenoid valve driving current when the solenoid valve is open at each solenoid valve temperature T.
FIG. 5 is a diagram showing a relationship between a solenoid valve temperature and a saturation current value.
FIG. 6 is a diagram showing a change in the solenoid valve driving current when the solenoid valve is open at each foreign matter thickness F.
FIG. 7 is a diagram showing a first-order differential (gradient) of each current of FIG. 6.

FIG. 8 is a diagram illustrating a method for estimating a foreign matter thickness.

FIG. 9A is an abnormality determination flowchart.

FIG. 9B is a diagram showing an example of a relationship between the solenoid valve temperature and feature data (explanatory variable).

FIG. 10 is a diagram showing a change in the solenoid valve driving current when the solenoid valve is open at each flow path internal pressure P.

FIG. 11 is a diagram showing a relationship between a flow path internal pressure and the solenoid valve driving current at an elapsed time $C_3$.

FIG. 12A is an abnormality determination flowchart.

FIG. 12B is a diagram showing an example of a relationship between the flow path internal pressure and the feature data (explanatory variable).

FIG. 13 is a block diagram of a solenoid valve control system.

FIG. 14 is a block diagram of a solenoid valve control system.

FIG. 15 is a diagram showing a solenoid valve abnormality detection device of the solenoid valve control system of FIG. 14.

FIG. 16 is a schematic diagram of an automatic medical analysis apparatus.

FIG. 17 is a diagram showing another implementation example of the solenoid valve control system.

DESCRIPTION OF EMBODIMENTS

Embodiments of the invention will be described in detail with reference to the drawings. In the following embodiments, elements (also including element steps and the like) are not essential unless otherwise specified or considered to be obviously essential in principle. In the drawings corresponding to the embodiments, the same components are denoted by the same reference numerals, and redundant descriptions will be omitted.

FIG. 1 is a block diagram of a solenoid valve control system 101. The solenoid valve control system 101 includes, as a main configuration, a plurality of solenoid valves 10, a solenoid valve driving device 20, a solenoid valve abnormality detection device 30, and a current sensor 31, which are mounted on an automatic medical analysis apparatus. Further, the solenoid valve driving device 20 includes, as a main configuration, a DC power supply 21, a plurality of relays 23 provided corresponding to the plurality of solenoid valves 10, a relay circuit 22 that opens and closes the relays 23, and a solenoid valve opening/closing control unit 24.

In response to opening and closing of the relays 23, a current from the DC power supply 21 is supplied to or cut off from the solenoid valves 10. The relays 23 respectively connected to the solenoid valves 10 are controlled by the solenoid valve opening/closing control unit 24 through the relay circuit 22, and the solenoid valves 10 are driven by the current from the DC power supply 21. The solenoid valve opening/closing control unit 24 includes hardware as a general computer such as a CPU, a DSP, a RAM, and a ROM. The ROM stores a control program executed by the CPU, a microprogram executed by the DSP, various types of data, and the like.

<Description of Operations of Solenoid Valve>

A diaphragm type solenoid valve and a non-diaphragm type solenoid valve are mounted on the automatic medical analysis apparatus. The diaphragm type solenoid valve includes a film (diaphragm) divided into a valve portion that opens and closes a flow path and a driving portion that moves the valve portion, and is suitable for a sampling portion of an analysis apparatus, medical equipment, or handling of acids, chemical agents, and the like that corrode metals. The non-diaphragm type solenoid valve is a solenoid valve including no diaphragm therein, and is characterized in that there is no change in an internal volume due to opening and closing, pulsation in the flow path is small, and pressure resistance is excellent. FIG. 2 shows a structure of the non-diaphragm type solenoid valve. When a current flows through a coil 11 (voltage application), a pole piece 12 and a plunger (movable iron core) 13 are magnetized, and the plunger 13 is driven by a mutual attracting force. This driving method is the same for the diaphragm type solenoid valve. When a driving force is larger than a repulsive force of a spring 14, a rubber 15 set in the plunger 13 is separated from a valve seat 16, and a fluid in the flow path flows (solenoid valve opening state). A movement distance until the solenoid valve is fully open is a stroke 17. On the other hand, by cutting off the current applied to the coil 11 of the solenoid valve, the driving force is lost, and the plunger 13 and the rubber 15 are returned to the valve seat 16 due to the repulsive force of the spring 14 to close the flow path, so that the fluid in the flow path does not flow (solenoid valve closed state).

FIG. 3 shows a change in a solenoid valve driving current associated with solenoid valve opening. The driving current supplied from the power supply to the solenoid valve increases after the current supply starts, and decreases at the same time as the valve starts to be opened, that is, the rubber set in the plunger that blocks the valve seat is separated from the valve seat. Then, when the plunger hits and is absorbed by the pole piece, the solenoid valve driving current rises again through an inflection point, and is finally stable at a predetermined current value (saturated state). A saturation current $I_s$ is a value obtained by dividing a DC voltage E of the DC power supply 21 by coil resistance R. In the drawing, a plunger movement start period Da is a period from when the supply of the driving current starts to when a movement of the plunger starts, a plunger movement period $D_b$ is a period from when the movement of the plunger starts to when the plunger is moved by a specified stroke and stops, and an attracting period D is a sum of the plunger movement start period $D_a$ and the plunger movement period $D_b$.

As shown in the drawing, for example, when a foreign matter is sandwiched in the solenoid valve, a driving current variation pattern (broken line pattern) during a solenoid valve opening operation (rise) is different from a driving current variation pattern (solid line pattern) during a solenoid valve opening operation in a normal state. In addition, a saturation current amount (broken line pattern) when the solenoid valve is overheated due to a coil short circuit or the like is smaller than a saturation current amount (straight line pattern) in the normal state. Thus, a solenoid valve driving current pattern associated with the solenoid valve opening varies in accordance with the state of the solenoid valve, and when a plurality of abnormalities occur, the variation of the driving current pattern due to each abnormality appears in a superimposed manner. By utilizing this fact, in the present embodiment, states related to the solenoid valve, specifically, a solenoid valve temperature, a flow path internal pressure, and the solenoid valve opening state are estimated based on the change in the solenoid valve driving current pattern associated with the solenoid valve opening, and the abnormality of the solenoid valve is detected.

<Configuration of Solenoid Valve Abnormality Detection Device>

The solenoid valve abnormality detection device 30 includes, as a main configuration, a feature data extraction unit 32, a feature data correction unit 33, an opening state estimation unit 34, a data storage unit 35 that stores data necessary for abnormality detection of the solenoid valve, and an abnormality determination unit 36. Descriptions of operations and processing contents in configurations of the solenoid valve abnormality detection device 30 will be described later.

<Solenoid Valve Temperature Estimation Method>

A method for estimating the solenoid valve temperature based on the change in the solenoid valve driving current pattern will be described. As is generally well known, a coil resistance value of the solenoid valve 10 varies depending on the solenoid valve temperature. Here, a predetermined temperature is determined as a reference temperature To, and a parameter such as a resistance value at the reference temperature $T_0$ is set as a "reference value" at the reference temperature. When the temperature of the solenoid valve 10 rises, the resistance value of the coil of the solenoid valve increases. A relationship between a solenoid valve temperature T and a solenoid valve coil resistance value RT can be expressed by (Equation 1).

$$R_T = R_0 \times (1 + \alpha_0 (T - T_0)) \qquad \text{(Equation 1)}$$

Here, $\alpha_0$ is a resistance temperature coefficient of a solenoid valve coil copper wire at the reference temperature $T_0$, and $R_0$ is a solenoid valve coil resistance reference value, that is, a solenoid valve coil resistance value at the reference temperature $T_0$.

According to (Equation 1), for example, when a temperature rises by 40° C. with respect to the reference temperature $T_0$, the solenoid valve coil resistance value $R_T$ is about 1.15 times the solenoid valve coil resistance reference value $R_0$. When the coil is made of a material such as aluminum wire, the same calculation equation can also be applied.

FIG. 4 is a diagram showing a change in the solenoid valve driving current associated with the solenoid valve opening at each solenoid valve temperature T ($T_0 < T_1 < T_2$). As can be seen from the drawing, as compared with the solenoid valve driving current at the reference temperature $T_0$, the solenoid valve driving currents at the solenoid valve temperatures $T_1$ and $T_2$ higher than the reference temperature $T_0$ decrease in accordance with (Equation 1).

In the present embodiment, a detection period (in this example, a detection period from $C_1$ to $C_2$) is determined, and the solenoid valve driving current pattern associated with the solenoid valve opening is grasped as feature data of the driving current in the detection period. As the feature data, a maximum value, a minimum value, an average value, a standard deviation, a saturation current value, an inflection point value, and the like of the current or a current differential in the detection period are considered. Reasons why the detection period is determined in this manner are as follows. For example, in the example of FIG. 4, there is almost no difference in current amount caused by the solenoid valve temperature during the rise of the solenoid valve driving current. When the feature data of the driving current is calculated by including the current value in such a period, features may be diluted. In addition, unlike a case where only the solenoid valve temperature changes as shown in FIG. 4, when abnormalities other than the solenoid valve temperature also occur, influences of other abnormalities are also superimposed, and thus it is difficult to specify the period for calculating the feature data of the driving current based on the solenoid valve driving current pattern itself. Therefore, for each solenoid valve, a period in which an influence of the solenoid valve temperature remarkably appears in the solenoid valve driving current pattern associated with the solenoid valve opening is determined in advance as the detection period. In the present embodiment, the expression "each solenoid valve" means each solenoid valve whose solenoid valve driving current pattern associated with the solenoid valve opening is considered to be the same. For example, in a case of solenoid valves having the same model number, the same detection period can be determined.

For $C_1$ and $C_2$ which are two ends of the detection period, a period in which the influence of the solenoid valve temperature appears in the solenoid valve driving current pattern at a time of normal operation may be selected, but, the detection period from $C_1$ to $C_2$ needs to include the inflection point (an end point of the attracting period D), and it is desirable that the start point $C_1$ is set to a timing included in the plunger movement start period $D_a$, and the end point $C_2$ is set to a timing at which a driving current amount reaches the saturation current value.

In addition, a starting point of time measurement of the detection period from $C_1$ to $C_2$ is defined as a time point at which the solenoid valve driving current becomes a trigger current $I_0$. Accordingly, the solenoid valve abnormality detection device 30 has advantages in that the detection period can be specified while monitoring only the solenoid valve driving current and that the feature data of the driving current in the detection period can be calculated. Of course, it is also possible to receive a control signal of the relay circuit 22 by the solenoid valve opening/closing control unit 24 and use the control signal as a trigger.

FIG. 5 is a diagram showing a relationship between the solenoid valve temperature and the saturation current value of the solenoid valve driving current. Since the saturation current value $I_s = E / R_T$, the DC voltage E is constant, and the solenoid valve coil resistance value $R_T$ has the relationship of (Equation 1), the saturation current value $I_s$ of the solenoid valve driving current is inversely proportional to the solenoid valve temperature T (the higher the solenoid valve temperature is, the smaller the saturation current value of the solenoid valve driving current is) as expressed by (Equation 2).

$$I_s k = {}_1 T + b_1 \qquad \text{(Equation 2)}$$

In (Equation 2), $k_1$ is a proportional coefficient, and $b_1$ is a constant.

When the detection period from $C_1$ to $C_2$ is set as shown in FIG. 4, the saturation current value of the solenoid valve driving current is the maximum value of the solenoid valve driving current. Therefore, it is possible to estimate the solenoid valve temperature based on the feature data (in this example, the maximum value) of the solenoid valve driving current in the detection period from $C_1$ to $C_2$ without adding a temperature sensor. Further, in the present embodiment, as will be described later, an objective variable (solenoid valve opening state and flow path internal pressure) other than the solenoid valve temperature is estimated based on driving current information of the solenoid valve, and by correcting the feature data correlated with the objective variable based on the estimated temperature, the influence of the solenoid valve temperature can be eliminated from the driving current information of the solenoid valve, and the objective variable can be estimated more accurately.

<Estimation of Solenoid Valve Opening State>

A method for estimating the solenoid valve opening state based on the change in the solenoid valve driving current pattern will be described. In the solenoid valve shown in FIG. 2, when a foreign matter is sandwiched between the pole piece 12 and the plunger 13, an opening degree of the solenoid valve reduces if a foreign matter thickness is large. As a result, an abnormality occurs in which a flow rate of the fluid in the flow path reduces. Therefore, the solenoid valve opening state, that is, the thickness of the sandwiched foreign matter is estimated based on the feature data of the driving current in the detection period of the solenoid valve driving current pattern.

FIG. 6 is a diagram showing a change in the solenoid valve driving current associated with the solenoid valve opening at each thickness F ($F_0 < F_1 < F_2$) of the sandwiched foreign matter. In any case, the solenoid valve temperature is the same. FIG. 7 is a diagram showing a first-order differential (gradient) of each solenoid valve driving current of FIG. 6. A position and a size of the inflection point in which the solenoid valve opening state is greatly affected appear more remarkably in the first-order differential of the solenoid valve driving current than in the solenoid valve driving current. As the foreign matter thickness increases ($F_0 < F_1 < F_2$), the decrease in the driving current associated with the movement of the plunger is reduced, and the solenoid valve driving current reaches saturation earlier.

The solenoid valve opening state (foreign matter thickness) is estimated using an estimation model created in advance based on the feature data of the driving current in the detection period for each solenoid valve. Specifically, the estimation model is constructed for the foreign matter thickness F by a method such as multivariate analysis based on the feature data of the driving current in the detection period. Here, the estimation model is an arithmetic expression representing a correspondence relationship between the feature data and the foreign matter thickness. For example, the estimation model based on a generalized linear model can be expressed by (Equation 3).

$$Y = m_0 + m_1 V_1 + m_2 V_2 + \ldots + m_n V_n \quad \text{(Equation 3)}$$

Here, Y is a foreign matter thickness (objective variable) estimated based on the estimation model, $V_1$ to $V_n$ are feature data (explanatory variables) of the driving current in the detection period, and $m_0$ to $m_n$ are constants. The constants $m_0$ to $m_n$ have different values depending on the solenoid valve. The feature data (explanatory variable) uses feature data correlated with the foreign matter thickness (objective variable), and the number of n is freely selected, but errors of the estimation model can be reduced by constructing the estimation model with as few types of explanatory variables as possible.

FIG. 8 is a diagram showing a method for estimating the foreign matter thickness using a generalized linear model method. A horizontal axis represents measurement values of foreign matter thicknesses, and a vertical axis represents foreign matter thicknesses Y estimated based on the estimation model. True foreign matter thicknesses (measurement values) are distributed in the vicinity of an estimation line 801 when accuracy is 100% (without estimation error or variation). A limit value $M_1$ of the foreign matter thickness (inversely proportional to an opening degree of the flow path) in an actual operation is determined by liquid feeding accuracy, a liquid feeding amount, and the like. When there is no estimation error or variation, an upper limit of the estimated foreign matter thickness Y can be set to $Y_1$ on the estimation line 801 corresponding to $M_1$, but the estimation error and the variation cannot be ignored in practice, so that the upper limit of the estimated foreign matter thickness is set to $Y_2$. That is, it is assumed that, when the estimated foreign matter thickness Y exceeds the upper limit $Y_2$, the amount of fluid passing through the solenoid valve is smaller than required liquid feeding accuracy, and liquid feeding insufficiency may occur.

Here, the generalized linear model method is described as an example of an estimation model construction method, but a model method other than the generalized linear model method, such as a model using a statistical method, may be used as long as the model construction method indicates the relationship between the foreign matter thickness and the feature data extracted from the driving current. As described above, the explanatory variables $V_1$ to $V_n$ used in the estimation model use values corrected based on an estimated temperature. Accordingly, it is possible to estimate the foreign matter thickness (objective variable) with higher accuracy.

First Embodiment

FIG. 9A is an abnormality determination flowchart executed by the solenoid valve abnormality detection device 30. An abnormality determination routine is executed at a predetermined sampling period during an operation of the automatic medical analysis apparatus in which the solenoid valve is operated. Accordingly, even when an abnormality occurs in the solenoid valve during the operation of the automatic medical analysis apparatus, an alarm is output without delay, and an influence of the abnormality in the solenoid valve can be minimized.

In FIG. 9A, a solenoid valve abnormality detection routine is started (START), and a solenoid valve driving current measurement is executed (step S2). Specifically, the feature data extraction unit 32 of the solenoid valve abnormality detection device 30 (see FIG. 1) receives input of a solenoid valve driving current value I from the current sensor 31, starts counting by a timer from a time point when the current value I is the trigger current $I_0$, and acquires the solenoid valve driving current value I in a predetermined detection period from $C_1$ to $C_2$.

The feature data extraction unit 32 performs processing such as noise removal and differentiation processing on the acquired solenoid valve driving current value I in the detection period from $C_1$ to $C_2$ (step S3), and calculates the feature data such as the maximum value, the minimum value, the average value, the standard deviation, and the inflection point value of the current and the current differential in the predetermined detection period (step S4). The feature data exemplified here are examples, and only the feature data used for subsequent estimation of the solenoid valve temperature or an estimation of the solenoid valve opening state (foreign matter thickness) may be calculated.

Next, the feature data correction unit 33 estimates the solenoid valve temperature using the feature data correlated with the calculated solenoid valve temperature, specifically, the maximum value of the solenoid valve driving current value I in the detection period from $C_1$ to $C_2$ (step S5), and when the estimated temperature is higher than a set limit temperature, the abnormality determination unit 36 outputs a solenoid valve overheated alarm signal to the outside (step S6). The set limit temperature is stored in the data storage unit 35. When the estimated temperature is within an allowable range, temperature correction is performed on the feature data used for estimating the foreign matter thickness (step S7).

In the data storage unit 35, information on a change amount of feature data (explanatory variable) $V_i$ depending on the solenoid valve temperature is stored in advance for each solenoid valve and each piece of feature data (explanatory variable) $V_i$. For example, as shown in FIG. 9B, it is assumed that the change amount of the feature data (explanatory variable) $V_i$ depending on the solenoid valve temperature is stored as a relationship expressed by (Equation 4).

$$V_i = k_2 T + b_2 \quad \text{(Equation 4)}$$

In (Equation 4), $k_2$ is a proportional coefficient, and $b_2$ is a constant.

At this time, when it is assumed that an estimated value of the solenoid valve temperature is $T_e$ and a measured value of the feature data (explanatory variable) $V_i$ is $V_{ie}$, $V_{ic}$ which is the feature data (explanatory variable) $V_i$ corrected to an equivalent value at the reference temperature $T_0$ is calculated by (Equation 5).

$$V_{ic} = V_{ie} + k_2 (T_e - T_0) \quad \text{(Equation 5)}$$

The above is merely an example, and the correction method is not limited thereto. In advance, for each solenoid valve, in a normal operation state, the solenoid valve temperature is changed, a change in the feature data of the solenoid valve driving current in the predetermined detection section is obtained by actual measurement or simulation, a relationship between the solenoid valve temperature and the feature data of the solenoid valve driving current is stored in the data storage unit 35 as a relational expression or a table, and temperature correction is performed by a method corresponding to the relational expression or the table.

Next, based on the estimation model described above, the opening state estimation unit 34 calculates the foreign matter thickness by performing a calculation of (Equation 3) using the feature data of the solenoid valve driving current which is subjected to the temperature correction and acquired from the feature data extraction unit 32 and the constants of the estimation model (step S8). The estimation model is stored in the data storage unit 35.

Next, the abnormality determination unit 36 compares the foreign matter thickness estimated by the estimation model with reference value data stored in the data storage unit 35. When it is determined that the estimated foreign matter thickness Y is larger than the upper limit value $Y_2$ that is the reference value data (YES in step S8), the abnormality determination unit 36 outputs, to the outside, a foreign matter sandwiched alarm signal indicating that a foreign matter exceeding the allowable range is sandwiched in the solenoid valve (step S9).

When it is determined that no abnormality occurs (step S6 or NO in step S8), the processing of this routine ends (END).

Effects of First Embodiment

As described above, the solenoid valve temperature can be estimated using the feature data of the solenoid valve driving current value, and the solenoid valve opening state can be accurately estimated. In addition, by visualizing states related to the solenoid valve, it is possible to specify a failed solenoid valve and save labor in solenoid valve maintenance. Even in a configuration in which different types of solenoid valves are mixed, it is possible to perform accurate determination since information necessary for abnormality determination is stored for each solenoid valve.

The solenoid valve abnormality detection device may be mounted on a board of the solenoid valve driving device 20 or may be configured as an external device of the solenoid valve driving device 20. In addition, in the feature data calculation in the detection period, a sampling frequency or a calculation amount may be adjusted as necessary. Accordingly, the amount of data can be greatly reduced by the objective variable, and analysis and diagnosis work also is facilitated. Further, machine learning or the like can be introduced into stored data, and accuracy of the estimation model for the foreign matter thickness can be increased.

Second Embodiment

In a second embodiment, in addition to a solenoid valve temperature, a flow path internal pressure of a flow path in which a solenoid valve is disposed is calculated based on a solenoid valve driving current, and a solenoid valve opening state is estimated using feature data of a solenoid valve driving current value corrected based on the calculated flow path internal pressure in a predetermined detection period. In the following description, portions corresponding to those of the first embodiment described above are denoted by the same reference numerals, detailed descriptions thereof are omitted, and different contents will be mainly described.

FIG. 10 is a diagram showing a change in the solenoid valve driving current associated with solenoid valve opening for each flow path internal pressure ($P_{-1} < P_0 < P_1$). In any case, the solenoid valve temperature is the same. Here, a driving current amount at a certain elapsed time $C_3$ before the solenoid valve driving current reaches a saturation current value from an inflection point (an end point of the attracting period D) is focused on. Although a solenoid valve driving current pattern greatly changes in the vicinity of the inflection point (the end point of the attracting period D) depending on the flow path internal pressure, an influence of a deviation at a time point of reaching the inflection point is gradually reduced during a period from the inflection point to a convergence to the same saturation current value, and a difference in the driving current is dominated by a difference in the flow path internal pressure.

FIG. 11 is a diagram showing a relationship between the flow path internal pressure and the solenoid valve driving current at the elapsed time $C_3$ shown in FIG. 10. As shown in the drawing, the solenoid valve driving current $I_{c3}$ at the elapsed time $C_3$ is inversely proportional to the flow path internal pressure P (the higher the flow path internal pressure is, the smaller the solenoid valve driving current at the elapsed time $C_3$ is) as indicated in (Equation 6).

$$I_{c3} = k_3 P + b_3 \quad \text{(Equation 6)}$$

In (Equation 6), $k_3$ is a proportional coefficient, and $b_3$ is a constant. In the second embodiment, the solenoid valve driving current $I_{c3}$ at the elapsed time $C_3$ is extracted as the feature data of the solenoid valve driving current value in the detection section from $C_1$ to $C_2$. Then, in estimating of the solenoid valve opening state, the feature data used in an estimation model is set to a value obtained by correcting the flow path internal pressure to a value at a reference pressure $P_0$. Accordingly, it is possible to eliminate an influence of the flow path internal pressure and estimate states related to the solenoid valve with higher accuracy.

FIG. 12A is an abnormality determination flowchart executed by the solenoid valve abnormality detection device 30. This abnormality determination routine is executed at a predetermined sampling period during an operation of an automatic medical analysis apparatus in which the solenoid valve is operated.

In FIG. 12A, temperature correction (step S7) from a start of the abnormality determination routine is the same as a flow of FIG. 9A. However, the feature data extraction (step S4) includes extraction of the feature data necessary for estimating the flow path internal pressure, specifically, extraction of the solenoid valve driving current $I_n$ at the elapsed time $C_3$, and the temperature correction (step S7) also includes correction of the solenoid valve driving current In based on an estimated temperature.

The feature data correction unit 33 estimates the flow path internal pressure using the feature data correlated with the extracted flow path internal pressure, specifically, the solenoid valve driving current Ica at the elapsed time $C_3$ which is subjected to the temperature correction (step S10). When the estimated flow path internal pressure is higher or lower than a set limit pressure, the abnormality determination unit 36 outputs a flow path internal pressure alarm signal to the outside (step S12). A set flow path internal pressure is stored in the data storage unit 35. When the estimated flow path internal pressure is within an allowable range, pressure correction is performed on the feature data (after temperature correction) used for estimating the foreign matter thickness to obtain a value at the reference pressure $P_0$ (step S11).

In the data storage unit 35, information on a change amount in the feature data (explanatory variable) $V_i$ depending on the flow path internal pressure is stored in advance for each solenoid valve and each piece of feature data (explanatory variable) $V_i$. For example, as shown in FIG. 12B, it is assumed that the change amount of the feature data (explanatory variable) $V_i$ depending on the flow path internal pressure is stored as a relationship of (Equation 7). This correlation is obtained when the solenoid valve temperature is equal to or lower than the reference temperature $T_0$.

$$V_i = k_4 P + b_4 \quad \text{(Equation 7)}$$

In (Equation 7), $k_4$ is a proportional coefficient, and $b_4$ is a constant.

At this time, when it is assumed that an estimated value of the flow path internal pressure is $P_e$ and a measured value of the feature data (explanatory variable) $V_i$ is $V_{ie}$, $V_{ic}$ which is the feature data (explanatory variable) $V_i$ corrected to an equivalent value at the reference flow path internal pressure $P_0$ is calculated by (Equation 8).

$$V_{ic} = V_{ie} + k_4 (P_e - P_0) \quad \text{(Equation 8)}$$

The above is merely an example, and the correction method is not limited thereto. In advance, for each solenoid valve, in a normal operation state under the reference temperature To, the flow path internal pressure is changed, a change in the feature data of the solenoid valve driving current in a predetermined detection section is obtained by actual measurement or simulation, a relationship between the flow path internal pressure and the feature data of the solenoid valve driving current is stored in the data storage unit 35 as a relational expression or a table, and pressure correction is performed by a method corresponding to the relational expression or the table.

Hereinafter, the processing from the calculation of the foreign matter thickness (step S8) to an end of the abnormality determination routine is the same as the flow of FIG. 9A. However, in the calculation of the foreign matter thickness (step S8), the feature data of the solenoid valve driving current which is subjected to the temperature correction and the pressure correction and which is acquired from the feature data extraction unit 32 is used.

Effects of Second Embodiment

As described above, in the second embodiment, the flow path internal pressure can be estimated using the feature data of the solenoid valve driving current value, and the solenoid valve opening state can further be accurately estimated.

Hereinafter, modifications of the solenoid valve control system shown as the first embodiment or the second embodiment will be described.

In a solenoid valve control system 102 shown in FIG. 13, the solenoid valve abnormality detection device 30 supplies an alarm signal to the solenoid valve opening/closing control unit 24. In response to the supplied alarm signal, the solenoid valve opening/closing control unit 24 executes a recovery operation for a corresponding solenoid valve. For example, when a solenoid valve overheated alarm is received, a solenoid valve overheated failure can be prevented by delay in a time to a next operation. In addition, when a foreign matter sandwiched alarm is received, the solenoid valve is repeatedly opened and closed, so that a temporarily sandwiched foreign matter can be caused to flow into a flow path. In this manner, in order to prevent an analysis apparatus from being stopped due to a failure of the solenoid valve, the solenoid valve control system 102 automatically executes an operation of solving a detected failure of the solenoid valve.

In a solenoid valve control system 103 shown in FIG. 14, the current sensor 31 is provided for each solenoid valve. That is, a current sensor 31-$i$ detects a current value $I_i$ flowing through a solenoid valve 10-$i$ ($i = 1$ to N). Meanwhile, as shown in FIG. 15, a solenoid valve abnormality detection device 301 is configured to detect, for each solenoid valve, an abnormality based on a driving current $I_i$, and detects an abnormality of a solenoid valve i by the abnormality detection method described in the first embodiment or the second embodiment. According to this configuration, even when a plurality of solenoid valves are simultaneously opened and closed, it is possible to estimate abnormalities of the solenoid valves based on driving current information of the respective solenoid valves.

FIG. 16 is a schematic diagram of an automatic medical analysis apparatus incorporating the solenoid valve control system of the present embodiment. An automatic medical analysis apparatus 110 incorporates the solenoid valve control system capable of detecting an abnormality of a solenoid valve incorporated in a liquid feeding unit 111 including a flow path and the solenoid valve disposed in the flow path. Here, the solenoid valve control system is shown to have the configuration of the first embodiment or the second embodiment, and may also be a modification or a combination of the embodiments and the modifications.

In response to an alarm signal from the solenoid valve abnormality detection device 30, an alarm or a warning message is displayed on a control operation screen (panel) of the automatic medical analysis apparatus 110. By estimating an abnormal state of the solenoid valve based on current information on the solenoid valve of the automatic medical analysis apparatus, it is possible to optimize a replacement period of each solenoid valve and save labor in maintenance more efficiently.

Another implementation example of the solenoid valve control system of the present embodiment will be described with reference to FIG. 17. An industrial controller 130 cooperates with automatic medical analysis apparatuses 120 connected by a network, and achieves control on each apparatus, collection of data from various sensors, and seamless vertical integration with a host information system 150. In addition, functions of an industrial computer and an open integrated development environment of a programmable logic controller (PLC) are integrated into one. Not only the automatic medical analysis apparatuses 120 are controlled individually, but also an entire clinical laboratory in which an examination is performed using a plurality of automatic medical analysis apparatuses 120 is optimized by collecting and analyzing information from each apparatus.

In an environment in which such vertical integration is achieved, the industrial controller 130 includes an information collection unit 131 and a solenoid valve abnormality detection unit 132. Each of the automatic medical analysis apparatuses 120 includes solenoid valves 10-1 to 10-N. The information collection unit 131 of the industrial controller 130 collects the solenoid valve driving current value I from the solenoid valve driving device 20 of each automatic medical analysis apparatus 120. The solenoid valve abnormality detection unit 132 of the industrial controller 130 has the same configuration as that of the solenoid valve abnormality detection device described in the embodiments or the modifications, and detects an abnormality of the solenoid valve.

In this manner, for the plurality of automatic medical analysis apparatuses connected to the network, the industrial controller can estimate an abnormal state of each of the plurality of solenoid valves provided in each automatic medical analysis apparatus. Therefore, it is possible to optimize a replacement period of each solenoid valve in each automatic medical analysis apparatus and save labor in maintenance more efficiently.

The invention is not limited to the embodiments and modifications described above, and various modifications are possible. The embodiments and the modifications described above are examples for easy understanding of the invention, and the invention is not necessarily limited to those including all the configurations described above.

A part of the configuration of a certain embodiment can be replaced with the configuration of another embodiment, and the configuration of another embodiment can be added to the configuration of a certain embodiment. In addition, a part of the configuration of each embodiment can be deleted, or another configuration can be added or replaced.

In addition, control lines and information lines are considered to be necessary for explanation, and not all the control lines and the information lines are necessarily shown on a product. In practice, it may be considered that almost all the configurations are connected to each other.

REFERENCE SIGNS LIST

10 solenoid valve
11 coil
12 pole piece
13 plunger (movable iron core)
14 spring
15 rubber
16 valve seat
17 stroke
20 solenoid valve driving device
21 DC power supply
22 relay circuit
23 relay
24 solenoid valve opening/closing control unit
30 solenoid valve abnormality detection device
31 current sensor
32 feature data extraction unit
33 feature data correction unit
34 opening state estimation unit
35 data storage unit
36 abnormality determination unit
101 to 103 solenoid valve control system
110, 120 automatic medical analysis apparatus
111 liquid feeding unit
130 industrial controller
131 information collection unit
132 solenoid valve abnormality detection unit
150 cloud and host system
301 solenoid valve abnormality detection device

The invention claimed is:

1. A solenoid valve abnormality detection device for detecting an abnormality of a solenoid valve based on a driving current pattern which is associated with solenoid valve opening of the solenoid valve and which is detected by a current sensor, the solenoid valve abnormality detection device comprising:
    a feature data extraction unit configured to obtain feature data of the driving current pattern associated with the solenoid valve opening of the solenoid valve in a predetermined detection period;
    a feature data correction unit configured to estimate a solenoid valve temperature of the solenoid valve based on a saturation current value of the solenoid valve, and correct a value of the feature data obtained by the feature data extraction unit to a value at a reference temperature that is based on the estimated solenoid valve temperature; and
    an opening state estimation unit configured to estimate an opening state of the solenoid valve using an estimation model configured to estimate the opening state of the solenoid valve based on the feature data of the driving current pattern associated with the solenoid valve opening of the solenoid valve and the value of the feature data corrected by the feature data correction unit.

2. The solenoid valve abnormality detection device according to claim 1, wherein
    the feature data extraction unit extracts a current value at a predetermined elapsed time in the detection period as one piece of the feature data of the driving current pattern associated with the solenoid valve opening of the solenoid valve, and
    the feature data correction unit estimates a flow path internal pressure of a flow path in which the solenoid valve is disposed based on the current value at a predetermined detection time which is corrected to a value at the reference temperature, and corrects the value of the feature data corrected to the value at the reference temperature to a value at a reference pressure that is based on the estimated flow path internal pressure.

3. The solenoid valve abnormality detection device according to claim 2, wherein
    the predetermined elapsed time is set as a time from after a movement of a plunger of the solenoid valve is stopped to when a driving current of the solenoid valve reaches the saturation current value.

4. The solenoid valve abnormality detection device according to claim 1, wherein
    the detection period is defined based on a timing at which a current value detected by the current sensor is a predetermined value.

5. The solenoid valve abnormality detection device according to claim 1, further comprising:
    a data storage unit configured to store a relationship between the solenoid valve temperature and the saturation current value of a driving current of the solenoid valve, the relationship being used for estimating the solenoid valve temperature of the solenoid valve, and a relationship between the solenoid valve temperature and the feature data, the relationship being used for correcting the value of the feature data obtained by the feature data extraction unit to the value at the reference temperature.

6. The solenoid valve abnormality detection device according to claim 2, further comprising:
a data storage unit configured to store a relationship between the solenoid valve temperature and the saturation current value of a driving current of the solenoid valve, the relationship being used for estimating the solenoid valve temperature of the solenoid valve, a relationship between the flow path internal pressure and the current value at the predetermined elapsed time under the reference temperature, the relationship being used for estimating the flow path internal pressure of the flow path in which the solenoid valve is disposed, a relationship between the solenoid valve temperature and the feature data, the relationship being used for correcting the value of the feature data obtained by the feature data extraction unit to the value at the reference temperature, and a relationship between the flow path internal pressure and the feature data, the relationship being used for correcting the value of the feature data at the reference temperature to the value at the reference pressure.

7. The solenoid valve abnormality detection device according to claim 1, further comprising:
an abnormality determination unit configured to output an alarm signal based on a state that is related to the solenoid valve and that is estimated by the feature data correction unit and the opening state estimation unit.

8. An automatic medical analysis apparatus comprising:
a liquid feeding unit including a flow path and a solenoid valve disposed in the flow path;
a solenoid valve driving circuit configured to drive the solenoid valve; and
the solenoid valve abnormality detection device according to claim 7, wherein
when the solenoid valve abnormality detection device outputs the alarm signal, an alarm or a warning message is displayed on an operation screen.

9. The automatic medical analysis apparatus according to claim 8, wherein
the solenoid valve driving circuit receives the alarm signal from the solenoid valve abnormality detection device and executes a recovery operation for the solenoid valve.

10. The automatic medical analysis apparatus according to claim 9, wherein
the recovery operation differs depending on a state related to the solenoid valve for which the alarm signal is output.

11. The automatic medical analysis apparatus according to claim 8, wherein
the liquid feeding unit includes a plurality of the solenoid valves, and
the solenoid valve driving circuit includes a DC power supply, a plurality of relays provided corresponding to the plurality of solenoid valves and configured to control supply of a driving current from the DC power supply to the solenoid valves, and a relay circuit configured to open and close the plurality of relays.

12. The automatic medical analysis apparatus according to claim 11, wherein
the current sensor detects a value of a current flowing between the DC power supply and the plurality of relays.

13. The automatic medical analysis apparatus according to claim 11, wherein
the current sensor detects a value of a current flowing between any one of the plurality of relays and a solenoid valve connected to the relay.

14. A solenoid valve abnormality detection method for detecting an abnormality of a solenoid valve in an automatic medical analysis apparatus including a liquid feeding unit which includes a flow path and the solenoid valve disposed in the flow path, the solenoid valve abnormality detection method comprising:
obtaining feature data of a driving current pattern associated with solenoid valve opening of the solenoid valve in a predetermined detection period;
estimating a solenoid valve temperature of the solenoid valve based on a saturation current value of the solenoid valve, and correcting a value of the feature data to a value at a reference temperature that is based on the estimated solenoid valve temperature;
estimating an opening state of the solenoid valve using an estimation model configured to estimate the opening state of the solenoid valve based on the feature data of the driving current pattern associated with the solenoid valve opening of the solenoid valve and the value of the feature data corrected to the value at the reference temperature; and
outputting an alarm signal when an abnormality is determined based on the estimated solenoid valve temperature of the solenoid valve or the opening state of the solenoid valve.

15. A solenoid valve abnormality detection method for detecting an abnormality of a solenoid valve in an automatic medical analysis apparatus including a liquid feeding unit which includes a flow path and the solenoid valve disposed in the flow path, the solenoid valve abnormality detection method comprising:
obtaining feature data of a driving current pattern associated with solenoid valve opening of the solenoid valve in a predetermined detection period;
extracting a current value at a predetermined elapsed time in the detection period as one piece of the feature data of the driving current pattern associated with the solenoid valve opening of the solenoid valve;
estimating a solenoid valve temperature of the solenoid valve based on a saturation current value of the solenoid valve, and correcting a value of the feature data to a value at a reference temperature that is based on the estimated solenoid valve temperature;
estimating a flow path internal pressure of the flow path in which the solenoid valve is disposed based on the current value at the predetermined elapsed time which is corrected to the value at the reference temperature, and correcting the value of the feature data corrected to the value at the reference temperature to a value at a reference pressure that is based on the estimated flow path internal pressure;
estimating an opening state of the solenoid valve using an estimation model configured to estimate the opening state of the solenoid valve based on the feature data of the driving current pattern associated with the solenoid valve opening of the solenoid valve and the value of the feature data corrected to the value at the reference temperature and the reference pressure; and
outputting an alarm signal when an abnormality is determined based on the estimated solenoid valve temperature of the solenoid valve, the estimated flow path internal pressure, or the estimated opening state of the solenoid valve.

\* \* \* \* \*